Figure 1:
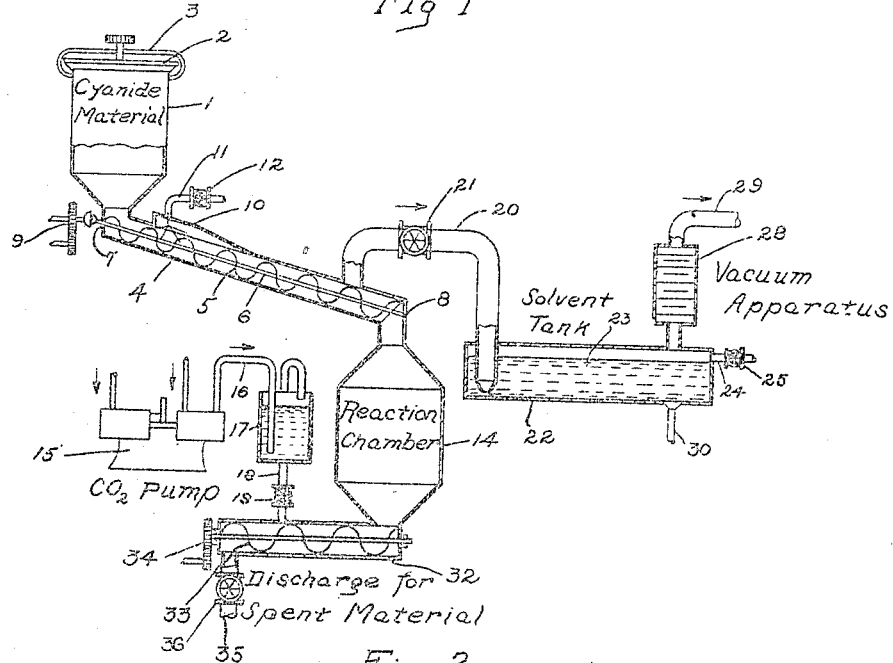

J. E. BUCHER
PRODUCTION OF HYDROCYANIC ACID
Filed July 7, 1923

Inventor
John E. Bucher
By Perley H. Plant
Attorney

Patented Feb. 17, 1925.

1,526,525

UNITED STATES PATENT OFFICE.

JOHN E. BUCHER, OF NEW YORK, N. Y., ASSIGNOR TO NITROGEN PRODUCTS COMPANY, OF PROVIDENCE, RHODE ISLAND, A CORPORATION OF RHODE ISLAND.

PRODUCTION OF HYDROCYANIC ACID.

Application filed July 7, 1923. Serial No. 650,150.

*To all whom it may concern:*

Be it known that I, JOHN E. BUCHER, a citizen of the United States, residing at New York, in the county of New York and State of New York, have invented certain new and useful Improvements in the Production of Hydrocyanic Acid, of which the following is a specification.

This invention relates to the production of hydrocyanic acid from cyanids or cyanid containing materials which may be treated while in a solid state or in solution to effect the liberation of hydrocyanic acid.

It has been stated by experimenters, that in the production of hydrocyanic acid from cyanids or cyanid containing materials one of two conditions was necessary in order to effect the formation of hydrocyanic acid at a percentage yield sufficiently approaching the theoretical to make the process practically operative and to prevent polymerization of the hydrocyanic acid, that is, that careful regulation of the reacting temperature was necessary in order to effect the formation of a relative large yield and the rapid withdrawal of the hydrocyanic acid from contact with the reaction mass was essential in order to prevent polymerization of the hydrocyanic acid formed. These conditions of operation necessitate careful manipulation and regulation, and require constant attention to prevent temperature variations as well as means adequate to maintain a constant and rapid withdrawal and separation of the hydrocyanic acid formed.

The main objects of the present invention are the production of hydrocyanic acid from cyanids and cyanid containing materials in a simple and efficient manner, whereby a relative high yield may be obtained and the resulting product be secured in such form and to such a degree of purity as to render the same capable of utilization commercially either as an article of manufacture or as the basis for the formation of cyanogen compounds, while avoiding the disadvantages incident to the modes of operation as above described.

Other objects and advantages of the invention relate to various novel methods of operation as will be more fully set forth in the detailed description to follow.

In the carrying out of my improved process I may employ the cyanid or cyanid containing materials in either solid form or as solutions, and I may use cyanid containing material such as that obtained from the fixation of nitrogen by means of an alkali metal salt in the presence of carbon and iron as described in my U. S. Patents 1,091,425 and 1,120,682.

My improved process comprehends in its broader aspects the formation of hydrocyanic acid from cyanids or cyanid containing materials by the action of organic acids or anhydrids, particularly carbon dioxid, as well as some of the weaker inorganic acids such as sulphurous acid. Also acid salts may be used to advantage in some cases.

I prefer, however, to employ carbon dioxid as the reactive agent both by reason of its cheapness and the readiness with which it may be obtained as well as the fact that when employed in the formation of hydrocyanic acid from cyanid containing material such as is formed by nitrogen fixation processes the material remaining after the removal of the hydrocyanic acid is in the form of an alkali metal bicarbonate which lends itself readily to repeated use in the nitrogen fixation process.

Although the action of carbon dioxid upon alkali metal cyanids in the presence of moisture to form hydrocyanic acid has been known, much trouble has been experienced in the practical effectuation of the reaction by reason of the decomposition of the hydrocyanic acid either during the process of formation or before it could be separated in a pure form. It is known that hydrocyanic acid in contact with such substances as alkali metal cyanids ammonium cyanid, caustic soda, sodium carbonate, etc., polymerizes or decomposes and that, hence alkaline substances such as cyanids, carbonates, or hydroxids of potassium sodium, or ammonium greatly favor such decomposition or polymerization at ordinary temperatures and are more particularly active in promoting such decomposition at elevated temperatures.

In order to overcome this difficulty it has been suggested, that a large excess of carbon dioxid be employed and that it be passed through the cyanid or cyanid containing materials in the presence of moisture with sufficient rapidity to prevent polymerization. This method of formation and removal of hydrocyanic acid if accomplished sufficiently rapidly to prevent polymerization is attended with serious disadvantages in that it is necessary to use a large excess of carbon dioxid in order to sweep out the hydrocyanic acid, which has a boiling point of 25° C., and is soluble in water. The volatilized hydrocyanic acid obtained in this way is necessarily very impure by reason of the large volume of carbon dioxid which it contains, and this makes it more difficult to liquefy by cooling because of the initially large partial pressure of the carbon dioxid, and this becomes greater the more the gaseous mixture is cooled. If the hydrocyanic acid gas is to be converted into cyanid by passing into contact with caustic soda solution the excess of carbon dioxid will form sodium carbonate in large quantities to contaminate the sodium cyanid.

I have found that by so operating as to reduce or substantially eliminate the amount of alkali metal cyanid in solution or in contact with the hydrocyanic acid, such great increase in the stability of the hydrocyanic acid results that yields which are essentially quantitative can be obtained and the above disadvantages thereby eliminated. By keeping the reactive mass as far as possible in a negative or acidic condition at all times not only is a substantially quantitative liberation of hydrocyanic acid obtained but the increased stability allows the hydrocyanic acid to stand in contact with the residual material so that there is ample time to effect the separation of the hydrocyanic acid by any suitable method. The cyanid solution,—cyanid material or cyanid containing mass may be acidified by means of the weak acid (as carbon dioxid) under conditions which limit the presence of alkali metal cyanides and when thus treated any desired temperature may be maintained and passage of carbon dioxid into contact with the cyanid mass or cyanid containing material will result in the formation of hydrocyanic acid while the acid condition of the material will prevent polymerization.

The following examples will serve to make clear how this may be done.

A solution of sodium cyanid may be quickly saturated with carbon dioxid by vigorous agitation at any convenient temperature, as for example 30° or 40° C., the agitation of the mass serving to hasten the hydrocyanic acid formation. Under these conditions polymerization does not occur immediately but the material shows a very considerable amount of stability in spite of the fact that the hydrocyanic acid has not been removed and that the temperature is already supposedly most favorable to polymerization.

An even better method than the foregoing is to keep the carbon dioxid in excess and add the cyanid slowly to the acid solution. In this case as in that described above vigorous agitation serves to increase the rapidity of the reaction and assure the maximum degree of acidity for the solution as the hydrocyanic acid is liberated, so that the quantity of alkali metal cyanid which is in contact with the hydrocyanic acid, and which is known to be harmful, is kept at the lowest possible concentration not only after the acid has been liberated but during its liberation.

The concentration of alkali metal cyanid depends primarily upon the law of mass action i. e. the concentration of the various substances, and the avidity of the two acids, hence, by the above procedure of keeping the carbonic acid in excess as much as possible, at all times while the reaction is going on, there is the minimum presence of sodium cyanid, and the tendency to polymerization is likewise reduced to a minimum without any excess of gas current or any removal of the hydrocyanic acid from the container in which the reaction takes place. Effecting the reaction under superatmospheric pressure is very advantageous as it keeps the concentration of carbonic acid higher than is possible at ordinary pressure and this serves to maintain the acidity of the reactive mass.

When a strong solution of sodium cyanid is used sodium bicarbonate precipitates out according to the equation:

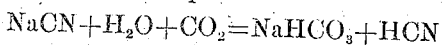

$$NaCN + H_2O + CO_2 = NaHCO_3 + HCN$$

and can be filtered off thus removing a large portion of the alkali which would otherwise be competing for the hydrocyanic acid to form injurious sodium cyanid. Here a low temperature is especially advantageous because it decreases the solubility of sodium bicarbonate and at the same time increases the solubility of the carbon dioxid in the solution as well as reduces the speed of polymerization. The stability of the resulting hydrocyanic acid in the filtrate can be increased by adding a small quantity of mineral acid such as hydrochloric or sulphuric acid to neutralize the remaining sodium bicarbonate, or, organic acids may be added, and if oxalic acid be used then a further purification due to the precipitation of the sparingly soluble neutral sodium oxalate is effected.

In place of carbon dioxid I may use oxalic acid to react with the cyanid, preferably keeping the acid in excess while the reaction is being effected. Here the neutral oxalate will precipitate out to a great extent according to the equation

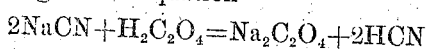

$$2NaCN + H_2C_2O_4 = Na_2C_2O_4 + 2HCN$$

because of its slight solubility and a hydrocyanid acid solution of very considerable stability results even when but little excess of oxalic acid is used because the avidity of oxalic acid is so great as compared with that of carbonic acid. Acid oxalates of sodium can be used with similar results if desired. If, on the other hand, one uses equivalent quantities of sodium cyanid and sodium bicarbonate to liberate hydrocyanic acid according to the equation

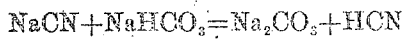

$$NaCN + NaHCO_3 = Na_2CO_3 + HCN$$

there will be very serious decomposition when the mass is heated. In like manner, sulphur dioxid, which is cheap and easily obtained can be used in the same way as carbon dioxid, preferably keeping it or its water solution in excess as far as possible during the reaction. It may also be used under pressure, and agitation by mechanical means may be advantageously employed as in the case of carbon dioxid.

The hydrocyanic acid formed may be removed from the solution or from the excess of acid gas employed by absorption in water either with or without agitation or in other solvents in which the hydrocyanic acid gas is readily soluble. The hydrocyanic acid may be recovered from the solvent by rectification or it may be converted into pure sodium cyanid by treating the solution with sodium hydroxid. The solvent may be present when the hydrocyanic acid is liberated or the acid may be recovered from an aqueous solution by agitating with benzene.

Another method of removing the hydrocyanic acid is by distilling under diminished pressure with a rectifying column, so that the excess water returns to the solution and the gas passes through a drying tower and then through a condenser, which need be only moderately cooled, as there is no excessive amount of carbon dioxid present to lower the partial pressure of the hydrocyanic acid with consequent difficulty in liquefaction.

In fact, by certain of the above cited methods the hydrocyanic acid will be obtained nearly or entirely free from carbon dioxid or other weak acid used as a reacting agent, and hence need be neither dried nor condensed but may be liquefied or aspirated directly through caustic soda to obtain liquid hydrocyanic acid or pure sodium cyanid.

In the case of the more stable solutions such as will stand a sufficiently high temperature the acid may be recovered directly by boiling and rectification without the use of diminished pressure.

As an alternative method of removing the hydrocyanic acid from the container in which it is formed and to prevent undue contamination with carbon dioxid gas I may sweep out the hydrocyanic acid by means of current of inert gas such as nitrogen. In this way the amount of carbon dioxid gas which is mingled with the hydrocyanic acid formed is kept at a minimum and undue contamination of the hydrocyanic acid with carbon dioxid is prevented, there being normally only a slight amount of carbon dioxid present in excess of that required to form the hydrocyanic acid when the process is carried out in the manner indicated above. This is especially advantageous where the exit gas is used to prepare pure sodium cyanide from caustic soda.

My improved process comprehends the use of carbon dioxid, or other equivalent weak acid of the character above described, for reacting upon an alkali metal cyanid solution, moistened cyanid or cyanid containing material under conditions which serve to maintain the reacting acid (as carbon dioxid) in excess of the cyanid or cyanid containing material whereby the hydrocyanic acid liberated as a result of the reaction is retained in the presence of an acid media whereby polymerization or decomposition of the hydrocyanic acid formed is prevented regardless of the temperature so that the process can be carried out efficiently at ordinary or room temperatures or even higher if desired. By this method of operation the quantity of reacting acid (as carbon dioxid) present in the hydrocyanic acid is reduced to a minimum since the reaction chamber only need contain the reacting acid in excess. The gases from the reaction chamber may be passed through water or other liquid in which the reacting gas is less readily soluble than the hydrocyanic acid formed to absorb the hydrocyanic acid which may be recovered from the water or solvent by means of a fractionating column operated either with or without diminished pressure. If desired a small quantity of strong acid may be added to such solvent in order to stabilize the hydrocyanic acid. The relatively small amount of carbon dioxid or other reacting gas passes over without material absorption in the solvent. It is regarded as preferable that the cyanid or cyanid containing material be agitated while in the reaction zone to hasten the reaction and superatmospheric pressure may be employed to advantage as promoting the reaction.

In the accompanying drawings is shown forms of apparatus which may be employed in carrying out my improved process although it is to be understood that the apparatus shown is illustrative only, and that other forms and arrangements of apparatus may be employed for the purpose or the structures shown may be varied greatly without departing from the essential features of my invention.

Figure 2:
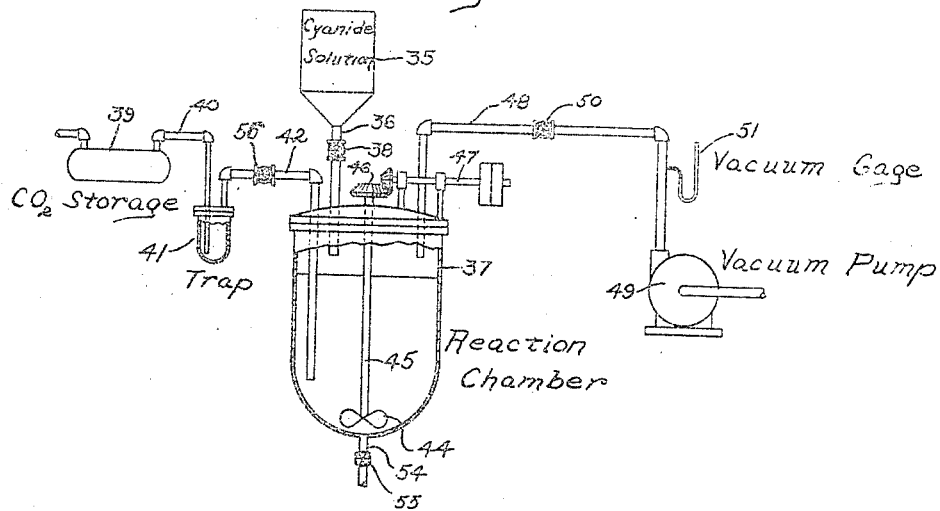

Fig. 1 is a diagrammatic illustration of a form of apparatus which may be employed in the recovery of hydrocyanic acid from solid cyanid bearing material by my improved method, and, Fig. 2 is a view of one form of apparatus which may be employed for treating cyanid solutions to convert the cyanid to hydrocyanic acid by my process.

Referring to the drawings:

1 indicates a container for receiving cyanid bearing material such as briquets or powdered material containing an alkali metal cyanid and formed by treatment according to a process for the fixation of nitrogen or the container 1 may be employed to receive solid alkali metal cyanid produced in any desired manner whether or not the same is mixed with other materials. A cover 2 is provided for the container 1 which may be secured thereon in any desired manner as by a fastening means 3. A spout 4 communicates with the base of the chamber 1 and may be inclined somewhat as shown in Fig. 1 to provide a passage for the material. A screw conveyor 5 is mounted in the spout 4 and comprises a shaft 6 supported by bearings 7 and 8 and driven in any suitable manner from a gear 9. The spout 4 is provided with an enlarged portion 10 with which a pipe 11 communicates whereby the material may be sprayed with a sufficient amount of water to moisten the material so that a proper amount of water will be present to secure complete or substantially complete conversion of the cyanid to hydrocyanic acid. The flow of water in the pipe 11 may be suitably controlled by regulating the valve 12.

The lower end of the spout 4 communicates with a reaction chamber 14 of suitable size which receives the material from the spout 4 and which is nominally filled with the weak reacting acid in vapor form, such, for example, as carbon dioxid. The carbon dioxid is supplied to the reaction chamber 14 by a pump 15 which forces the carbon dioxid through a pipe 16 and a trap 17, from which it passes to the reaction chamber through a pipe 18 provided with a valve 19. The pipe 18 communicates with the reaction chamber through the discharge pipe 32 whereby the reacting acid is brought into thorough contact with the cyanid containing material. A pipe 20 communicates with the spout 4, a short distance above the point where it enters the reaction chamber 14, and passes to a solvent containing tank 22. The pipe 20 is provided with a valve 21 the use of which will be referred to more particularly hereinafter. The tank 22 is partially filled with a suitably solvent 23 such as water, etc., in which hydrocyanic acid is more readily soluble than carbon dioxid or the other weak acid employed for carrying out the reaction.

From the tank 22 there extends a pipe 24 provided with a valve 25 through which the carbon dioxid or other reacting acid which is not absorbed by the solvent may be drawn off. Pressure in the tank 22 may be reduced at suitable periods by means of a vacuum apparatus 28 whereby the hydrocyanic acid taken up by the solvent may be removed and drawn off through pipe 29 to be treated in any desired manner in order to complete the purification of the hydrocyanic acid, such, for example, as by being passed through a drier, condenser, etc., to remove moisture and eliminate traces of the reacting acid which may be contained therein. The tank 22 may be suitably cooled to increase the absorption of the hydrocyanic acid while the reacting acid gas passes over and escapes through the pipe 24. A drain pipe 30 is provided by which the solvent liquid may be removed from the tank when desired. In operation two or more tanks 22 may be employed and these may be alternately placed in communication with the reaction chamber to absorb hydrocyanic acid formed as a result of the reaction and alternately cut off from the reaction chamber to operate the vacuum apparatus and remove from the liquid the hydrocyanic acid previously absorbed. The valve 21 is provided for the purpose of permitting each tank to be disconnected from the reaction chamber whenever desired. A discharge cylinder 32 communicates with the base of the reaction chamber and contains a screw conveyor 33 operated by gears 34 for withdrawing the treated material from the reaction chamber after the conversion of the cyanid contained therein to hydrocyanic acid.

A pipe 35 extends downwardly from the pipe 32 for the passage of the converted cyanid bearing material, and is provided with a valve 36 which may be closed while the reaction is proceeding to prevent escape of the reacting gas but which may be opened at suitable intervals and the conveyor 33 operated to draw out and remove the spent material.

In carrying out the process by means of the apparatus above described the cyanid bearing material is placed in the container 1 and fed through the spout 4 into the reaction chamber 14 by operating the screw conveyor 5 while a sufficient quantity of water is sprayed upon the material from the pipe 11 as the material traverses the spout 4 to permit complete or substantially complete conversion of the cyanid to hydrocyanic acid, upon treatment with the reacting acid. Carbon dioxid or other weak acid is forced through the pipe 16 by the pump 15 and caused to traverse the reaction chamber 14 in sufficient quantity to maintain an excess of acid in the reaction chamber and thus prevent substantial polymerization of the hydrocyanic acid formed. The acid may be supplied to the reaction chamber and maintained therein under any desired degree of superatmospheric pressure and increased pressure in the reaction chamber will result in promoting the hydrocyanic acid formation. As the material is fed into the reaction chamber through the spout 4 the material is stirred or agitated by the movement of the conveyor 5 as the carbon dioxid or other acid contacts therewith which also tends to hasten the reaction. During the portion of the operation the valves 36 and 21 may be closed to prevent escape of the gases and permit the desired degree of superatmospheric pressure being maintained in the reaction chamber. When the process has been continued sufficiently to form the desired amount of hydrocyanic acid in the reaction chamber the flow of cyanid containing material may be stopped and the valve 21 opened and the gases allowed to pass through the pipe 20 and into contact with the solvent in the tank 22. The tank 22 being suitably cooled and the hydrocyanic acid being readily soluble in the solvent it will be taken up readily and the reacting acid gas which is sparingly soluble in the solvent used may pass over and be withdrawn through the pipe 24 where it may be treated to remove the small quantities of hydrocyanic acid carried over therewith. The valve 19 may be closed during the removal of the gases from the reaction chamber to prevent undue contamination with the reacting acid gas. When the solvent in the tank 22 has absorbed as much hydrocyanic acid as it will readily contain under the conditions prevailing the valves 21 and 25 may be closed and the vacuum apparatus 28 operated to reduce the pressure upon the tank 22, the temperature of which may also be raised if desired to further facilitate the removal of the hydrocyanic acid contained in the solvent. After the removal of the hydrocyanic acid gas from the solvent in the tank 22 it may be passed through driers and condensers to remove the slight amounts of water vapor and reacting acid contained therein when it may be compressed or caused to react with an alkali metal hydroxid to produce pure alkali metal cyanid. After the gases have been substantially removed from the reaction chamber the valve 36 may be opened and the conveyor 33 operated to remove the spent material and prepare the reaction chamber for the treatment of a fresh supply of cyanide material.

If preferred, the method of removing the hydrocyanic acid from the reaction chamber may be modified by alternately passing the gases from the reaction chamber into any one of a plurality of tanks 22 whereby there is less interference with the hydrocyanic acid forming reaction in the reaction chamber and the process can be operated substantially continuously. It is to be understood that various changes may be made in the apparatus and the same may be modified to conform with changed conditions which may arise in practice while the method of treating the gases with a suitable solvent may be varied within reasonable limits without departing from the spirit and scope of the present invention.

The form of apparatus shown in Fig. 2 of the drawings is more particularly adapted for carrying out the reaction with a solution of alkali metal cyanid and comprises a cyanid containing receptacle 35 having a pipe 36 communicating with the reaction chamber 37 and having a valve 38 therein for regulating the flow of the cyanid containing solution. A pump 39 is provided for passing carbon dioxid or other suitable weak acid through the pipe 40, trap 41 and pipe 42 to the reaction chamber. The reaction chamber may be partially filled with a suitable liquid such as water and provided with a stirrer 44 carried by a shaft 45 and operated by gears 46 from a shaft 47. A pipe 48 leads from the reaction chamber 37 to a vacuum pump 49, the pipe being provided with a valve 50 and vacuum gauge 51. A pipe 53 leads from the vacuum pump to suitable driers and condensers (not shown) for the reception and purification of the hydrocyanic acid, and the reaction chamber 37 is provided with a drain pipe 54 having a valve 55 therein.

In carrying out the process by means of the apparatus shown in Fig. 2, the cyanid containing solution is placed in the container 35 and the valve 38 adjusted to permit a proper amount of the material to flow into the reaction chamber. The reaction chamber is partially filled with water or other solvent and carbon dioxid or other suitable reacting gas admitted to the reaction chamber by opening the valve 56 in the pipe 42 and starting the pump 39. The space above the liquid in the reaction chamber is filled with carbon dioxid or other reactive acid and this acid is constantly maintained in excess to prevent substantial polymerization of the hydrocyanic acid formed. The reactive acid may be forced into and maintained in the reaction chamber under the desired degree of super-atmospheric pressure and the liquid may be agitated by means of the stirrer 44. When a sufficient quantity of hydrocyanic acid has been formed to produce a high degree of concentration in the solvent in the reaction chamber the valves 38 and 55 are closed, the valve 50 opened and the pump 49 started to remove the hydrocyanic acid from the solvent. In this case substantially the only carbon dioxid or other reactive gas to be mixed with the recovered hydrocyanic acid is that which fills the space in the reaction chamber above the solvent and such slight amount as may be taken up by the solvent and removed therefrom under diminished pressure, the solvent selected being one in which hydrocyanic acid is much more readily soluble than is the reactive acid.

It is to be understood that the term cyanid containing material as employed in the appended claims is employed generically and is intended to cover alkali metal cyanid either in solid form or as a solution as well as such cyanid containing material as is obtained from the formation of cyanids in nitrogen fixation processes generally.

The term weak acid as employed herein is intended to embrace the anhydrides mentioned such as carbon dioxid and sulphur dioxid, these substances being used in the presence of water which is necessary to the carrying out of the hydrocyanic acid reaction.

What I claim is:—

1. The process of producing hydrocyanic acid from cyanid containing material which comprises, continuously feeding a relatively small quantity of cyanid containing material into a reaction chamber containing a quantity of weak acid which is relatively large in proportion to the quantity of cyanid containing material contained in the chamber which has not been acted upon by the acid, whereby an excess of said weak acid is maintained in the reaction chamber sufficient to prevent polymerization of the hydrocyanic acid formed.

2. The process of producing hydrocyanic acid from cyanid containing material which comprises, continuously feeding a relatively small quantity of cyanid containing material into a reaction chamber maintained under superatmospheric pressure and containing a quantity of weak acid in excess of the quantity of cyanid containing material in the reaction chamber which has not been acted upon by the acid.

3. The process of producing hydrocyanic acid from cyanid containing material which comprises treating the cyanid containing material with a weak acid in the presence of water while maintaining an excess of said weak acid in the reaction zone to prevent substantial polymerization of the hydrocyanic acid formed, and absorbing the hydrocyanic acid formed as a result of the reaction in a medium in which the weak acid is less soluble than the hydrocyanic acid.

4. The process of producing hydrocyanic acid from cyanid containing material which comprises treating the cyanid containing material with a weak acid in the presence of water and agitating the material while maintaining an excess of the weak acid sufficient to prevent substantial polymerization of the hydrocyanic acid formed.

5. The process of producing hydrocyanic acid from cyanid containing material which comprises treating the cyanid containing material with a weak acid in the presence of water and under superatmospheric pressure while agitating the reactive mass, and maintaining an excess of the weak acid sufficient to prevent substantial polymerization of the hydrocyanic acid formed.

6. The process of producing hydrocyanic acid from cyanid containing material which comprises treating the cyanid containing material with a weak acid in the presence of water and agitating the reactive mass while maintaining an excess of the weak acid in the reaction zone, and absorbing the hydrocyanic acid formed as a result of the reaction in a medium in which the weak acid is less soluble than the hydrocyanic acid.

7. The process of producing hydrocyanic acid from cyanid containing material which comprises treating the cyanid containing material with a weak acid in the presence of water and under superatmospheric pressure, and absorbing the hydrocyanic acid formed as a result of the reaction in a medium in which the weak acid is less soluble than the hydrocyanic acid.

8. The process of producing hydrocyanic acid from cyanid containing material which comprises treating the cyanid containing material with a weak acid in the presence of water while maintaining an excess of said weak acid in the reaction zone to prevent substantial polymerization of the hydrocyanic acid formed, absorbing the hydrocyanic acid in a medium in which the weak acid is less soluble than the hydrocyanic acid, and separating the hydrocyanic acid from the solvent under reduced pressure.

9. The process of producing hydrocyanic acid from cyanid containing material which comprises treating the cyanid containing material with a weak acid in the presence of water and agitating the reactive mass while maintaining an excess of the weak acid in the reaction zone, absorbing the hydrocyanic acid formed as a result of the reaction in a medium in which the weak acid is less soluble than the hydrocyanic acid, and separating the hydrocyanic acid from the solvent under reduced pressure.

10. The process of producing hydrocyanic acid from cyanid containing material which comprises treating the cyanid containing material with a weak acid in the presence of water and under superatmospheric pressure, absorbing the hydrocyanic acid formed as a result of the reaction in a medium in which the weak acid is less soluble than the hydrocyanic acid, and separating the hydrocyanic acid from the solvent under a pressure less than that at which the absorption of the hydrocyanic acid in the solvent was effected.

11. The process of producing hydrocyanic acid from cyanid containing material which comprises treating the cyanid containing material with carbon dioxid in the presence of water and agitating the reactive mass while maintaining an excess of carbon dioxid in the reaction zone sufficient to prevent substantial polymerization of the hydrocyanic acid but relatively small in proportion to the hydrocyanic acid formed as a result of the reaction.

12. The process of producing hydrocyanic acid from cyanid containing material which comprises treating the cyanid containing material with carbon dioxid in the presence of water and under superatmospheric pressure while agitating the reactive mass.

13. The process of producing hydrocyanic acid from cyanid containing material which comprises treating the cyanid containing material with carbon dioxid in the presence of water while maintaining an excess of said carbon dioxid in the reaction zone to prevent substantial polymerization of the hydrocyanic acid formed, and absorbing the hydrocyanic acid formed as a result of the reaction in a medium in which the carbon dioxid is relatively less soluble than the hydrocyanic acid.

14. The process of producing hydrocyanic acid from cyanid containing material which comprises treating the cyanid containing material with carbon dioxid in the presence of water while agitating the reactive mass and maintaining an excess of carbon dioxid sufficient to prevent substantial polymerization of the hydrocyanic acid formed.

15. The process of producing hydrocyanic acid from cyanid containing material which comprises treating the cyanid containing material with carbon dioxid in the presence of water and under superatmospheric pressure while agitating the reactive mass, and maintaining an excess of the carbon dioxid sufficient to prevent substantial polymerization of the hydrocyanic acid formed.

16. The process of producing hydrocyanic acid from cyanid containing material which comprises treating the cyanid containing material with carbon dioxid in the presence of water and agitating the reactive mass while maintaining an excess of the carbon dioxid in the reaction zone, and absorbing the hydrocyanic acid formed as a result of the reaction in a medium in which the carbon dioxid is soluble to a less degree than the hydrocyanic acid.

17. The process of producing hydrocyanic acid from cyanid containing material which comprises treating the cyanid containing material with carbon dioxid in the presence of water and under superatmospheric pressure, and absorbing the hydrocyanic acid formed as a result of the reaction in a medium in which the carbon dioxid is less readily soluble than the hydrocyanic acid.

18. The process of producing hydrocyanic acid from cyanid containing material which comprises treating the cyanid containing material with carbon dioxid in the presence of water while maintaining an excess of carbon dioxid in the reaction zone to prevent substantial polymerization of the hydrocyanic acid formed, absorbing the hydrocyanic acid in a medium in which the carbon dioxid is less soluble than the hydrocyanic acid, and separating the hydrocyanic acid from the solvent under reduced pressure.

19. The process of producing hydrocyanic acid from cyanid containing material which comprises treating the cyanid containing material with carbon dioxid in the presence of water and agitating the reactive mass while maintaining an excess of the carbon dioxid in the reaction zone, absorbing the hydrocyanic acid formed as a result of the reaction in a medium in which the carbon dioxid is less soluble than the hydrocyanic acid, and separating the hyrdocyanic acid from the solvent under reduced pressure.

20. The process of producing hydrocyanic acid from cyanid containing material which comprises treating the cyanid containing material with carbon dioxid in the presence of water and under superatmospheric pressure, absorbing the hydrocyanic acid formed as a result of the reaction in a medium in which the carbon dioxid is less soluble than the hydrocyanic acid, and separating the hydrocyanic acid from the solvent under a pressure less than that at which the absorption of the hydrocyanic acid in the solvent was effected.

21. The process of producing hydrocyanic acid from cyanid containing material which comprises treating the cyanid containing material with carbon dioxid in the presence of water and agitating the reactive mass while maintaining an excess of carbon dioxid in the reaction zone sufficient to prevent substantial polymerization of the hydrocyanic acid formed, and removing the hydrocyanic acid from the mass without material contamination by the carbon dioxid.

In testimony whereof I have affixed my signature.

JOHN E. BUCHER.